United States Patent
Pope et al.

(10) Patent No.: US 9,600,840 B1
(45) Date of Patent: Mar. 21, 2017

(54) PROXIMITY BASED RECOMMENDATIONS

(75) Inventors: Elmore Eugene Pope, Sammamish, WA (US); Michael P. Touloumtzis, Brookline, MA (US); Rouhollah Rahmani, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 435 days.

(21) Appl. No.: 13/476,241

(22) Filed: May 21, 2012

(51) Int. Cl.
*G06Q 30/06* (2012.01)
(52) U.S. Cl.
CPC ................. *G06Q 30/0631* (2013.01)
(58) Field of Classification Search
CPC ........... G06Q 30/0282; G06Q 30/0631; G06Q 30/0261

USPC .................... 705/26.1, 26.7, 14.58
See application file for complete search history.

(56) References Cited

U.S. PATENT DOCUMENTS

2007/0244750 A1* 10/2007 Grannan ................ G06Q 30/02
 705/14.64
2013/0218721 A1* 8/2013 Borhan et al. ............. 705/26.41

* cited by examiner

*Primary Examiner* — Mila Airapetian
(74) *Attorney, Agent, or Firm* — Thomas Horstemeyer, LLP

(57) ABSTRACT

Disclosed are various embodiments for providing proximity-based product recommendations. A computing device detects an interaction between a product and a user. The computing device provides to the user a recommendation of another product, based at least in part on proximity between the another product and the location of the product in the detected product interaction.

23 Claims, 5 Drawing Sheets

PROXIMITY BASED RECOMMENDATIONS

BACKGROUND

A customer's shopping experience can be enhanced in various ways by mobile computing devices. As one example, mobile computing devices allow a customer to obtain detailed product information and product reviews when viewing or evaluating the product. As another example, mobile computing devices allow a customer to find a product at one store then check the price of the same product at another store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to product recommendations, and more specifically, to recommendations based on the proximity of a mobile user to other products. In various embodiments disclosed herein, a user's current location is tracked through a mobile client device having some sort of location awareness. The interaction of a mobile user with various products is also monitored, which may include active and passive product interactions. For example, the user may move through a store and actively interact with products, for example by scanning a barcode or taking a photo. The user may also have various passive product interactions such as passing by a product having a near field communication (NFC) tag, a radio frequency identifier (RFID) tag, a Bluetooth® low energy (BLE) transmitter, or other types of product transmitters As various mobile client devices report product interactions, product location information is derived from the reported interactions and stored as product location data. Thus, a database of product location information can be built over time. The product information reported by mobile users may be supplemented with product location information that is provided by merchants.

The mobile client device uses this current location to request a proximity-based product recommendation from a computing device that is accessible over a network such as the Internet. In some cases, the mobile client device also includes product interaction information. The computing device identifies other products that are physically proximate to the user's location. If product interaction information is provided, the computing device may identify product that are physically proximate and that are relevant to product (s) with which the user has recently interacted. For example, if the user passes by an aisle containing potato chips, the recommendation service may recommend that the user buy soft drinks if data collected on customer behavior shows that users who buy potato chips are also likely to buy soft drinks. In making proximity-based recommendations, the service may take into account various types of data such as user-specific purchase history, aggregate user purchase history, as well as other types of data. In the following discussion, a general description of the system and its components is provided, followed by a discussion of the operation of the same.

Figure 1:
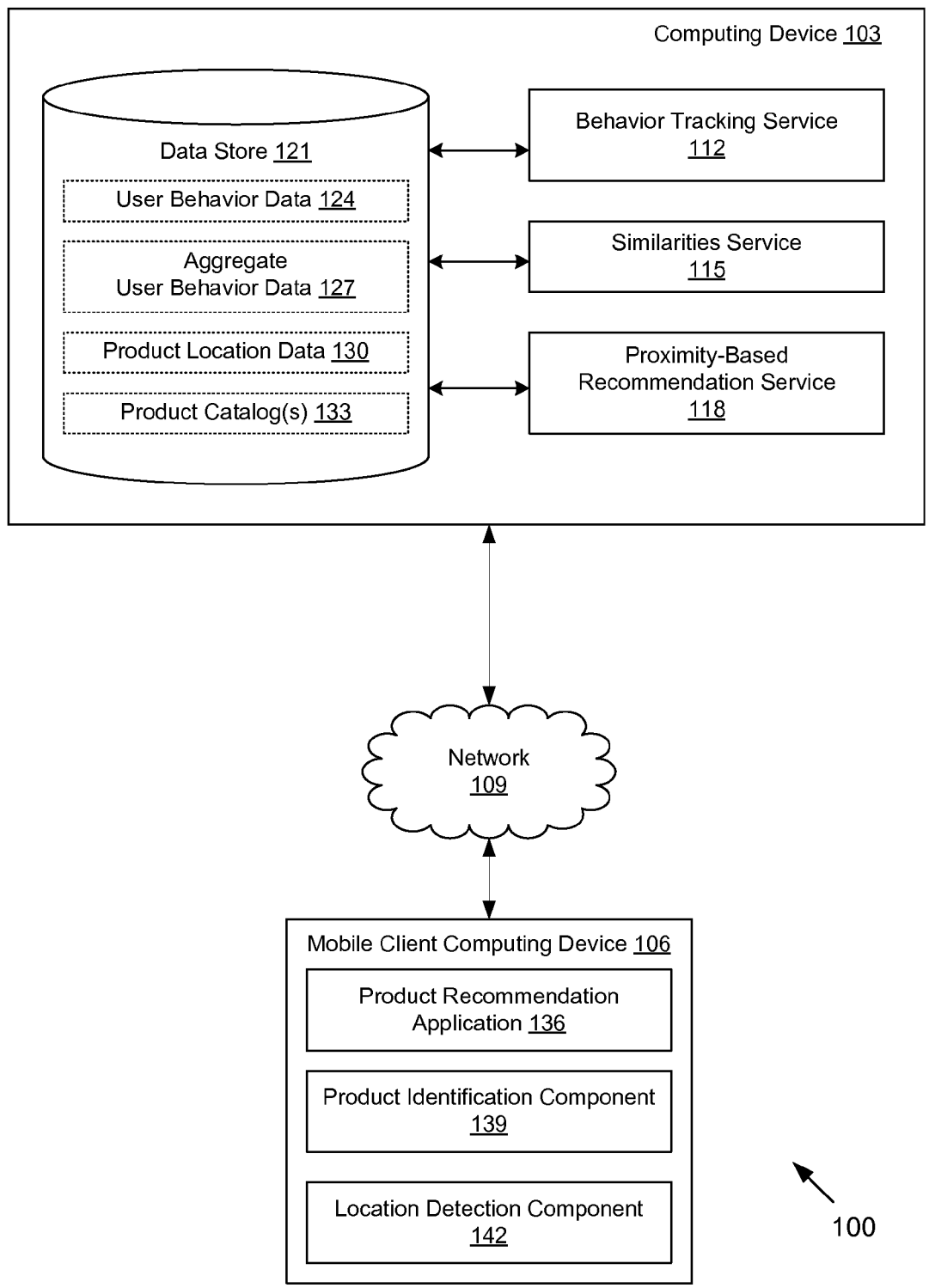
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more mobile client computing devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103 include, for example, a behavior tracking service 112, a similarities service 115, and a proximity-based recommendation service 118. Also, various data is stored in a data store 121 that is accessible to the computing device 103. The data store 121 may be representative of a plurality of data stores as can be appreciated. The data stored in the data store 121, for example, is associated with the operation of the various applications and/or functional entities described below. The data stored in the data store 121 includes, for example, user behavior data 124, aggregate user behavior data 127, product location data 130, one or more product catalogs 133, and potentially other data.

The behavior tracking service 112 is executed to track user interaction with products, thus building a history of products that a particular user has handled, a history of products with which the user has come into proximity, and/or a history of products that a user has purchased. The behavior tracking service 112 is also executed to track user proximity with merchants or stores. The data derived by the behavior tracking service 112 from this user interaction is stored as user behavior data 124.

The similarities service 115 is executed to return one or more items that are similar to an input item. The similarities service 115 uses the aggregate user behavior data 127 to determine similarity. Where the user behavior data 124 is associated with specific users, the aggregate user behavior data 127 is an aggregation of behavior tracking data from multiple users. For example, item B may be deemed to be similar to item A, under the following conditions: users who buy item A also buy item B; users who handle item A also handle item B; users who handle item A also buy item B. Similarity may also be determined based at least in part on relationships between items in the product catalogs 133. As one example, similarity may be determined based on whether items are members of a set or collection (e.g., a series of books or videos). As another example, similarity may be determined based on or whether one item is marked as a variation of another item (e.g., a media title on DVD and the same title on Blu-Ray®). As yet another example, similarity may be determined based on product categories, such that products in the same category or subcategory are deemed to be similar to each other.

The proximity-based recommendation service 118 is executed to generate a recommendation indicating that a user may be interested in a particular product, based at least in part on the current location of the user and the location of products with which the user has recently interacted. The proximity-based recommendation service 118 obtains the current location of a user and utilizes the aggregate user behavior data 127 to determine similarity. Where the user behavior data 124 is associated with specific users, the aggregate user behavior data 127 is an aggregation of behavior tracking data from multiple users.

In various embodiments, the components executed on the computing device 103 may utilize any type of middleware framework to communicate with each other or with applications executing on a mobile client computing device 106. Examples of such frameworks include remote procedure calls, service-oriented architecture protocol (SOAP), representational state transfer (REST), Windows Communication Foundation, and other frameworks. Although described herein as separate components, the functionality of the various components can also be combined, as should be appreciated.

The mobile client computing device 106 is representative of a plurality of mobile client devices that may be coupled to the network 109. The mobile client computing device 106 may comprise, for example, a processor-based system such as a computer system. Such a computer system may be embodied in the form of a smart phone, a cellular telephone, a personal digital assistant, an electronic book reader, a portable navigation system, a music player, a video player, a media player, a web pad, a tablet computer system, a game console, a laptop computer, or other devices with like capability. The mobile client computing device 106 may have an integrated display but may also be capable of attaching to another display or coupling to another device and using the display of the coupled device.

The mobile client computing device 106 may be configured to execute various applications such as a product recommendation application 136, a product identification component 139, and a location detection component 142. The mobile client computing device 106 may be configured to execute other applications such as, for example, browsers, email applications, instant message applications, navigation applications, and/or other applications.

The location detection component 142 is executed in the mobile client computing device 106 to detect the current location of the mobile client computing device 106, and by extension, of the user carrying the mobile client computing device 106. Various technologies may be used to implement the location detection component 142, for example, a global positioning system (GPS), an assisted global positioning system (A-GPS), a wireless local area network (WiFi) positioning system, or a wireless network (WiMax) positioning system. The location detection component 142 may rely on specialized hardware residing in the mobile client computing device 106, such as a GPS transceiver, a WiFi transceiver, and/or a WiMax transceiver, as should be appreciated. The location detection component 142 may also rely on other specialized hardware separate from the mobile client computing device 106, such as a GPS satellite network, one or more WiFi access points, and/or one or more WiMax access points, as should be appreciated.

In some embodiments, the location detection component 142 does not provide an absolute location in terms of geographic coordinates, but instead provides a notification that the mobile client computing device 106 is at a particular location based on detecting a specific signal associated with a store or merchant. For example, a merchant may install a transmitter at the store entrance that performs a handshake with the mobile client computing device 106, by which the mobile client computing device 106 learns the identity of the merchant (e.g., Target®) and/or the specific location of the retail location (Target® at 1234 Washington St., 30338). In some embodiments, the handshake also provides the merchant with the identity of the mobile client computing device 106 and/or the user associated with the device.

The product identification component 139 is executed in the mobile client computing device 106 to obtain product identifiers for products with which the user of the mobile client computing device 106 interacts. Some forms of obtaining product identifiers are passive, such as reading radio frequency identifiers (RFIDs) or near field communications (NFC) identifiers from products that are in proximity to the mobile client computing device 106. Other forms of obtaining product identifiers are active, that is, the activity is initiated by the user. For example, the user may utilize the product identification component 139 to obtain a product identifier by scanning a barcode, by taking a photo of a barcode, or by taking a photo of a product. The product recommendation application 136 may perform image recognition of a product barcode or a product photo in order to identify the product, or may instead utilize a local or remote service that performs the image recognition. The barcode may take the form of a one-dimensional (linear) barcode, a two-dimensional barcode (also known as a QR code), or any other type of barcode.

The product recommendation application 136 may be executed in the mobile client computing device 106 to request recommendations from the proximity-based recommendation service 118 that is executing in the computing device 103. To this end, the product recommendation application 136 provides to the proximity-based recommendation service 118 the user's current location and identifiers of product(s) with which the user has interacted. In some embodiments, the recommendations are requested without an explicit request by the user. In other embodiments, the user may explicitly instruct the proximity-based recommendation service 118 to provide a recommendation.

The product recommendation application 136 may also allow a customer to explicitly request more information about a particular product with which the user interacts. For example, the user may provide a product identifier to the product recommendation application 136, and the product recommendation application 136 may then provide further details about the product, including price, reviews, and so on. The product recommendation application 136 may be implemented as a standalone application or may be executed in the context of a browser, as should be appreciated.

Next, a general description of the operation of the various components of the networked environment 100 is provided. To begin, a mobile customer carrying a mobile client computing device 106 visits a store or retail location with a physical presence. Such stores are commonly referred to as "brick and mortar" to distinguish them from electronic commerce merchants with which a customer interacts online. While in the store, the customer interacts with one or more products, either passively or actively. As one example of passive use, the mobile client computing device 106 in close proximity to a product may read an identifier from a radio frequency (RF) tag attached to, co-located with, or otherwise associated with the product. Other forms of near field communication (NFC) may also be utilized by the mobile client computing device 106 to interact with a product without requiring involvement by the customer. Turning now to active interaction with a product, one example of active interaction is the customer utilizing the mobile client computing device 106 to scan or to take a photo of a barcode. As another example of active interaction with a product, the customer may utilize the mobile client computing device 106 to take a photo of a product, and then the mobile client computing device 106 may perform image recognition on the photo to identify a particular product.

While the customer is at the store, the mobile client computing device 106 also periodically determines the current position or location of the device. As noted above, various technologies may be used to obtain the current location, such as GPS and WiFi triangulation. After the customer has interacted with at least one product, the mobile client computing device 106 may communicate with the computing device 103 to make a request for a proximity-based product recommendation. The request may be made automatically on behalf of the user or may be made in response to an explicit request by the user. The mobile client computing device 106 may provide configuration options which allow the user to set the frequency of automatic requests, to disable the automatic request feature, and so on.

The recommendation request transmitted by the mobile client computing device 106 includes the location of the mobile client computing device 106, and thus, by extension, of the user. In some embodiments, the location detection component 142 executing in the mobile client computing device 106 is queried at the time of the recommendation request to provide increased accuracy. In other embodiments, a recent determination of the location of the mobile client device 106 is used unless the most recent determination is older than a predefined threshold, in which case the location detection component 142 may be queried for a more up-to-date location.

The recommendation request transmitted by the mobile client computing device 106 also includes information about one or more of the products with which the user has recently interacted. For example, the mobile client computing device 106 may include the last five product interactions, or the product interactions in the last five minutes, or all the product interactions since the last request for a proximity-based recommendation. The product interaction information may include a product identifier. In some embodiments, additional information about the interaction itself is included, such as the mechanism used to detect the interaction, the time of the interactions, or other information. As various mobile client computing devices 106 report product interactions to the proximity-based recommendation service 118, the service 118 derives product location information from the reported interactions, and stores this information as product location data 130. Thus, over time the proximity-based recommendation service 118 can build a database of product location information. The product information reported by mobile users may be used to supplement product location information that is provided by merchants.

Upon receiving a request for a proximity-based recommendation, the computing device 103 uses product location data 130 to identify products that are logically or physically proximate to the mobile client computing device 106. From a set of such proximate product candidates, the computing device 103 selects one or more that are relevant to the product(s) with which the user has recently interacted. Factors used in determining relevance may include product types or categories, similarity of the candidate product to the recently-interacted-with product, past shopping behavior of the user, aggregate shopping behavior of other users, and so on. The computing device 103 then provides a recommendation of the selected relevant and proximate products. The recommendation may include product identifiers, product description, price, and so on. In some embodiments, the product recommendation may also indicate a recommended store if the proximate and relevant product is available at a store other than the one at which the user is currently shopping.

The mobile client computing device 106 provides the proximity-based recommendation to the user, for example, on a user interface within the product recommendation application 136, or in the form of a network page rendered by a browser executing in the mobile client computing device 106. The user may then choose whether to act on the recommendation. If the user acts on the recommendation, the mobile client computing device 106 may gather additional information from the user's purchase and provide this purchase information to the computing device 103. The user then continues the shopping experience, which may include visiting another store, in which case the product recommendation application 136 may continue to provide proximity-based recommendations while the user is in the next store.

Figure 2:
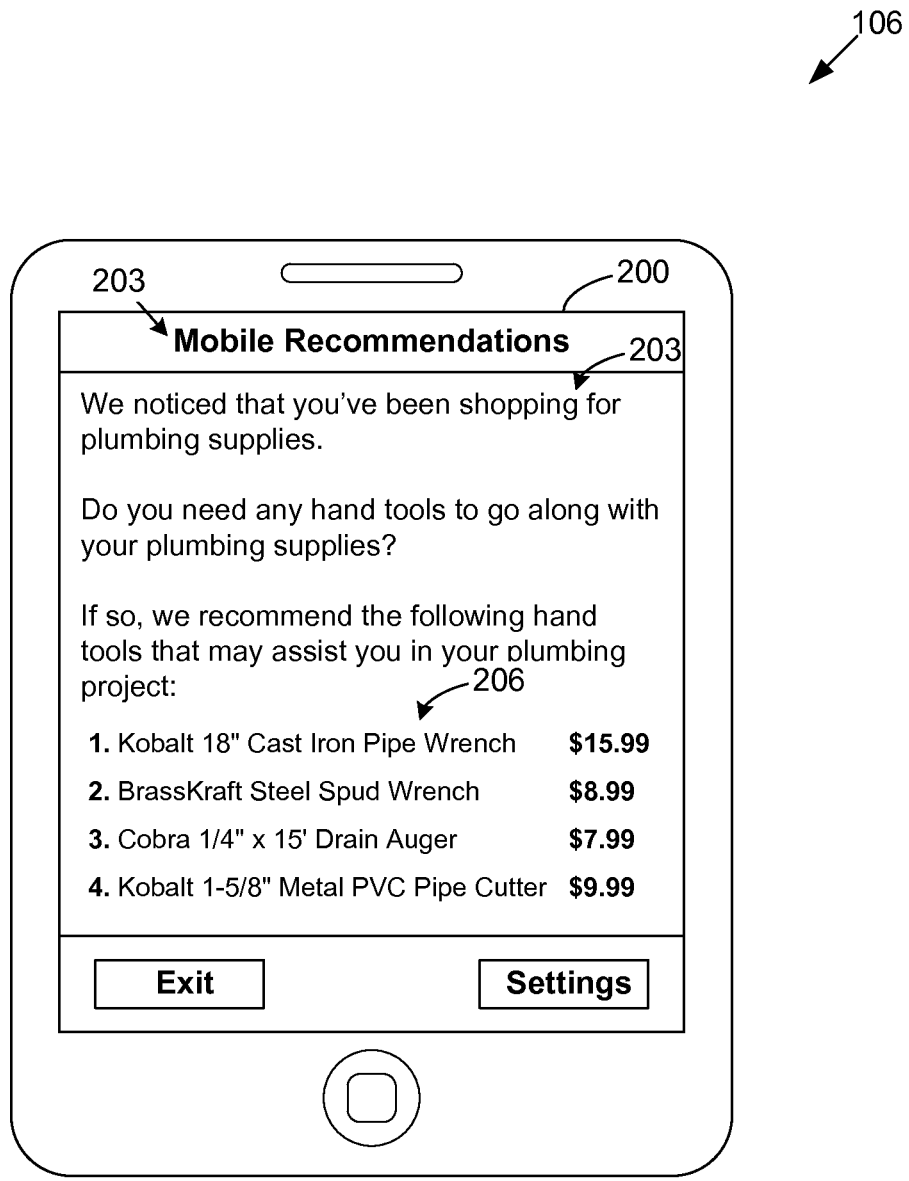
FIG. 2 is an example user interface rendered by an application executed in a mobile computing device in the networked environment of FIG. 1 according to various embodiments of the present disclosure.

Turning now to FIG. 2, shown is an example of a user interface rendered by product recommendation application 136 (FIG. 1) for display on a mobile client computing device 106 (FIG. 1). User interface 200 includes an application title 203 ("Mobile Recommendations") and a recommendation area 203. The recommendation area 203 includes text informing the user that the application 136 of the detected product category. In the example show in FIG. 2, the product recommendation application 136 has determined that the mobile user has been shopping for plumbing products, based on detected product interactions. The recommended products area 206 includes specific product recommendations provided by the proximity-based recommendation service 118 (FIG. 1) that is executing in the computing device 103 (FIG. 1). In this example, the recommended products area 206 includes four different hand tools which are associated with plumbing projects.

Figure 3:
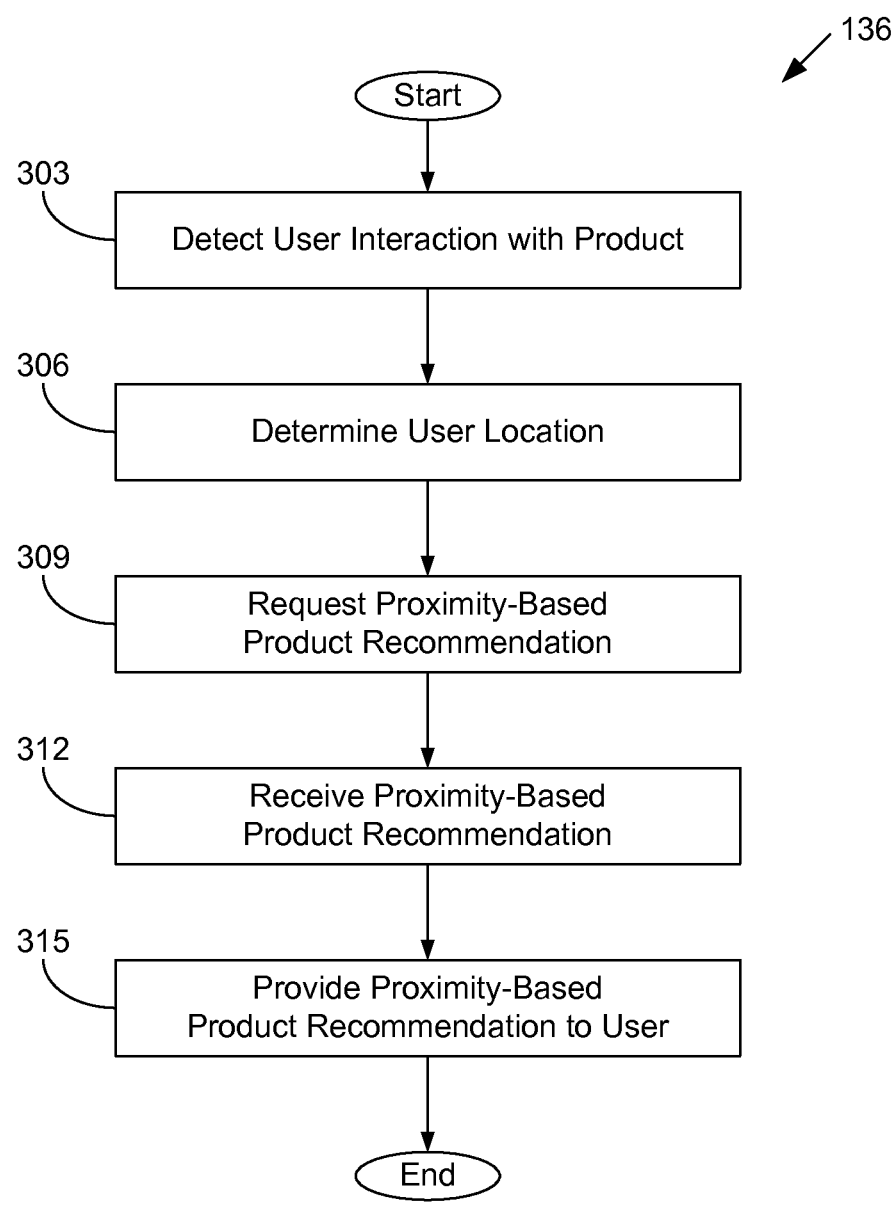
FIG. 3 is a flowchart illustrating one example of functionality implemented as portions of an application executed in a mobile computing device in the networked environment of FIG. 1 according to various embodiments of the present disclosure.

Moving on to FIG. 3, shown is a flowchart that provides one example of the operation of a portion of the product recommendation application 136 according to various embodiments. It is understood that the flowchart of FIG. 3 provides merely an example of the many different types of functional arrangements that may be employed to implement the operation of the portion of the product recommendation application 136 as described herein. As an alternative, the flowchart of FIG. 3 may be viewed as depicting an example of steps of a method implemented in the mobile client computing device 106 (FIG. 1) according to one or more embodiments.

Beginning at box 303, the product recommendation application 136 detects at least one interaction between a user of the mobile client computing device 106 and a product in physical proximity to the user. Such product interaction may be passively detected without user involvement, for example, by reading radio signals from tags attached to, co-located with, or otherwise associated with a product. The product interaction may be active and directed by the user, as when the user scans a barcode, takes a photo of a product, or enters a product identifier as text. In some embodiments, after detecting product interactions, the application 136 may report product location information to the proximity-based recommendation service 118 (FIG. 1) that is executing in the computing device 103 (FIG. 1). The service 118 may store product location information reported from various mobile users as product location data 130 (FIG. 1).

Next, at box 306 the product recommendation application 136 obtains, from the location detection component 142 (FIG. 1) executing on the mobile client computing device 106, the current location of the mobile client computing device 106. At box 309, the product recommendation application 136 requests a proximity-based recommendation from the proximity-based recommendation service 118 that is executing in the computing device 103. The product recommendation application 136 provides, in conjunction with the request, the current location of the mobile client computing device 106, as obtained at box 306. In some embodiments, the application 136 also provides, in conjunction with the request, an identifier of one or more products with which the user has recently interacted, as obtained at box 303. In cases in which no product interactions have been detected, the application 136 may retrieve product location data 130 from the from proximity-based recommendation service 118.

At box 312, the product recommendation application 136 receives a response to the recommendation request made at box 309. The recommendation includes information describing and/or identifying the recommended product(s). Next, at box 316, the product recommendation application 136 provides the recommendation to the user of the mobile client computing device 106, for example, by rendering a network page on a browser screen. The process of FIG. 3 is then complete.

Although not explicitly shown in the flowchart of FIG. 3, the product recommendation application 136 may run in the background. As may be appreciated, in such embodiments, the product recommendation application 136 may continue to detect additional product interactions, continue to update the user's location, and continue to request and provide recommendations as this new information is obtained.

Figure 4:
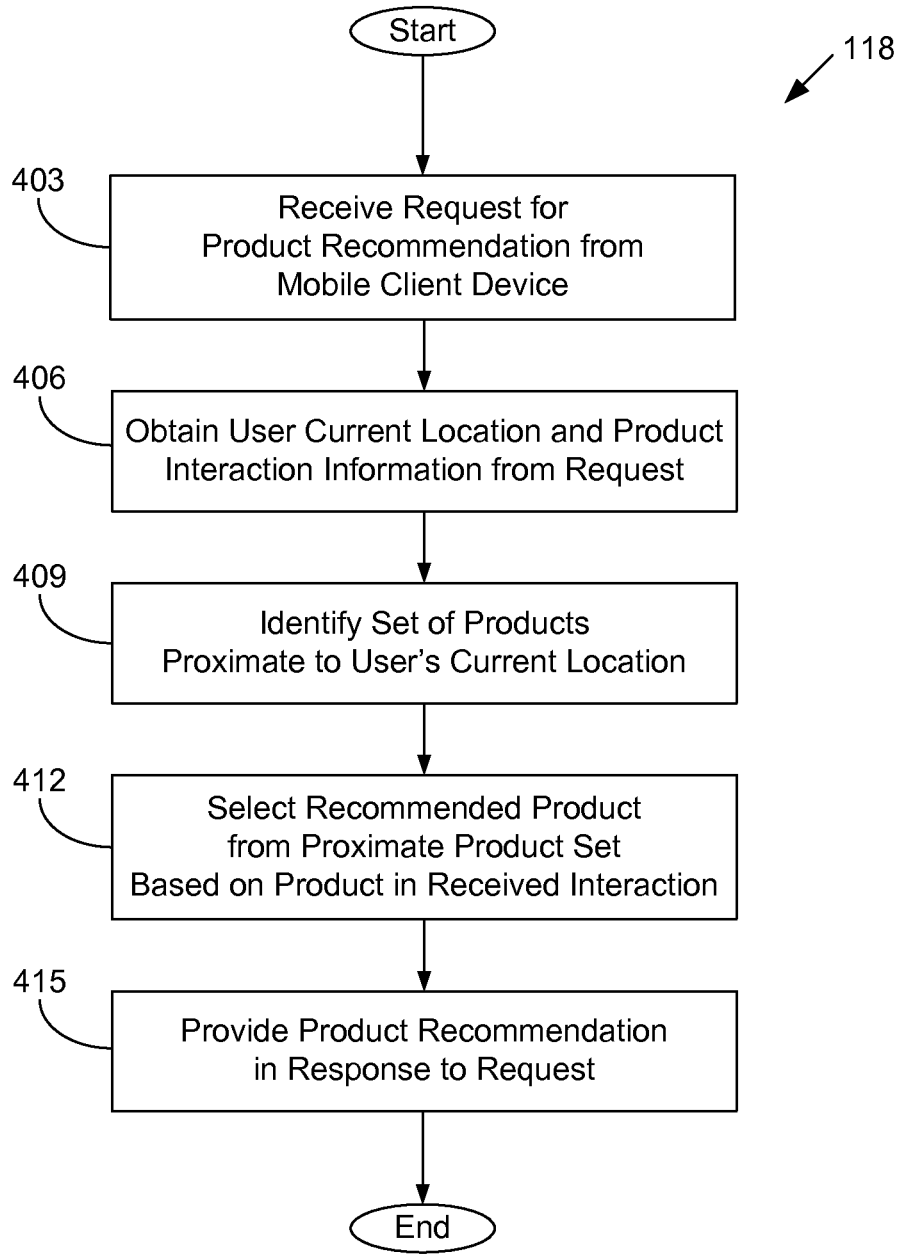
FIG. 4 is a flowchart illustrating another example of functionality implemented as portions of an application executed in another computing device in the networked environment of FIG. 1 according to various embodiments of the present disclosure.

With reference now to FIG. 4, shown is a flowchart that provides one example of the operation of a portion of the proximity-based recommendation service 118 according to various embodiments. It is understood that the flowchart of FIG. 4 provides merely an example of the many different types of functional arrangements that may be employed to implement the operation of the portion of the proximity-based recommendation service 118 as described herein. As an alternative, the flowchart of FIG. 4 may be viewed as depicting an example of steps of a method implemented in the computing device 103 (FIG. 1) according to one or more embodiments.

Beginning at box 403, the proximity-based recommendation service 118 receives a request for a proximity-based product recommendation from the product recommendation application 136 executing on a mobile client computing device 106 (FIG. 1). At box 406, the proximity-based recommendation service 118 obtains, from the request, the user's location. The proximity-based recommendation service 118 may also obtain information about a product with which the user has interacted, if such information is included in the request. The product interaction information includes a product identifier or description, and may include additional information about the interaction itself. For example, the product interaction information may specify whether the user's interaction with the product was passive or active, the mechanism used to detect the interaction (e.g., barcode, photo, radio frequency tag, user search query, etc.), the time of the user's interaction, and so on.

Next, at box 409, the proximity-based recommendation service 118 identifies a set of one or more products that are logically or physically proximate to the user's location using product location data 130 (FIG. 1). Such products can be identified in various ways. In one embodiment, the proximity-based recommendation service 118 receives product location information transmitted by the products themselves. For example, individual products may have radio frequency tags, or groups of products may be co-located or otherwise associated with a wireless transceiver that broadcasts location information for the individual products in the group. The service 118 may update the product location data 130 as such information is provided by the products or groups of products.

In another embodiment, the proximity-based recommendation service 118 obtains product location information from merchants, stores, and/or retailers. The service 118 may update the product location data 130 as such information is provided by merchants. Such product location information may be provided as part of an electronic product catalog that also includes other types of product information. The merchant may make these products in the electronic catalog available through an electronic commerce application. The merchants may also provide the proximity-based recommendation service 118 with inventory or other information regarding availability of products. The operator of the proximity-based recommendation service 118 may provide an incentive for merchants to share product location information in the form of revenue sharing.

In yet another embodiment, the proximity-based recommendation service 118 aggregates reports of product interactions from multiple users to dynamically learn the locations of products that are stocked by merchants, stores, and/or retailers as users interact with those products. The proximity-based recommendation service 118 may increase the reliability of location information obtained in this manner by requiring a threshold number of reported product interactions before relying on the information, or by using the time/date of these product interactions to discard old information.

Next, at box 412, the proximity-based recommendation service 118 selects one or more products from the set of proximate product candidates as recommended products, based at least on the product interaction information included in the recommendation request. As explained earlier, such information indicates a product with which the user has recently interacted in some manner. The interaction may be passive, such as when the mobile client computing device 106 reads a radio frequency tag or receives a broadcast from a transmitter associated with the device. The interaction may be active, such as when the user scans the barcode from a product, takes a photo of the product, or enters an identifier such as a stock keeping unit (SKU) or Universal Product Code (UPC) via a keyboard. In any case, the proximity-based recommendation service 118 uses the identity of the product in the interaction to select from the set of proximate products those product(s) which are likely to be of interest to the user. For example, if the user is shopping in a supermarket and has passed by a box of cookies, the service 118 may recommend milk to the user. The proximity-based recommendation service 118 may utilize similarities service 115 (FIG. 1) to determine which products are similar to the product in the reported interaction. As explained earlier, the similarities service 115 may uses data reported by multiple users and stored as aggregate user behavior data 127 (FIG. 1) in order to determine similarities.

The proximity-based recommendation service 118 may provide recommendations with various levels of specificity. For example, the service 118 may make a general recommendation of milk as a product, or a more specific recommendation that the user purchase milk at the same store. As another example, if the user is shopping in a home improvement store and has scanned the barcode for a can of paint, the service 118 may recommend that the user purchase the same paint at another home improvement store in the same general vicinity. The level of specificity may be tied to the resolution of the location information.

The recommendation may be based on factors other than the user location and recent product interaction information. For example, the proximity-based recommendation service 118 may take into account one or more types of user behavior data 124 (FIG. 1), which may include a history of purchases by the user, a history of product interactions, a history of merchants visited by the user, and so on. The proximity-based recommendation service 118 may also take into account promotions, sale, or special events associated with particular merchants when making recommendations.

At box 415, the proximity-based recommendation service 118 provides the recommendation to the user by sending it to the requesting mobile client computing device 106. The recommendation may be provided in various forms. For example, the service 118 may generate a network page for rendering by a browser executing on the mobile client computing device 106, or the service 118 may provide information about the recommended product(s), which the mobile client computing device 106 uses to generate a local network page.

Various types of information may be included in the recommendation. For example, the service 118 may provide limited information that merely identifies the recommended product and, optionally, a recommended merchant. As another example, the service 118 may provide identifying information as well as product details. The service 118 may also provide pricing information, such as the purchase price at the user's current location, the purchase price at other merchants in the general vicinity, and the purchase price at one or more merchants having an online presence. The process of FIG. 4 is then complete.

In the embodiment discussed in connection with FIG. 4, the mobile client computing device 106 provides both a current user location and one or more product interactions, and the proximity-based recommendation service 118 uses both of these types of data to make a recommendation. In another embodiment, the proximity-based recommendation service 118 uses current user location to make the proximity-based recommendation, without the use of product interaction data. For example, the mobile client computing device 106 may indicate that the user is at a particular physical location, and the proximity-based recommendation service 118 may look up the store that corresponds to this location and further, the department or aisle of the particular store. The service 118 may then recognize that the user is in the soft drink aisle and recommend that the user purchase potato chips or other snack foods, without the user having interacted with any soft drink products. In yet another embodiment, the proximity-based recommendation service 118 uses detected product interactions but not current user location to make the proximity-based recommendation. For example, the mobile client computing device 106 may indicate that the user has passed by one or more soft drink products by detecting RFID tags co-located with such products, and the proximity-based recommendation service 118 may recommend that the user purchase potato chips or other snack foods, without being informed about the user's actual location.

Figure 5:
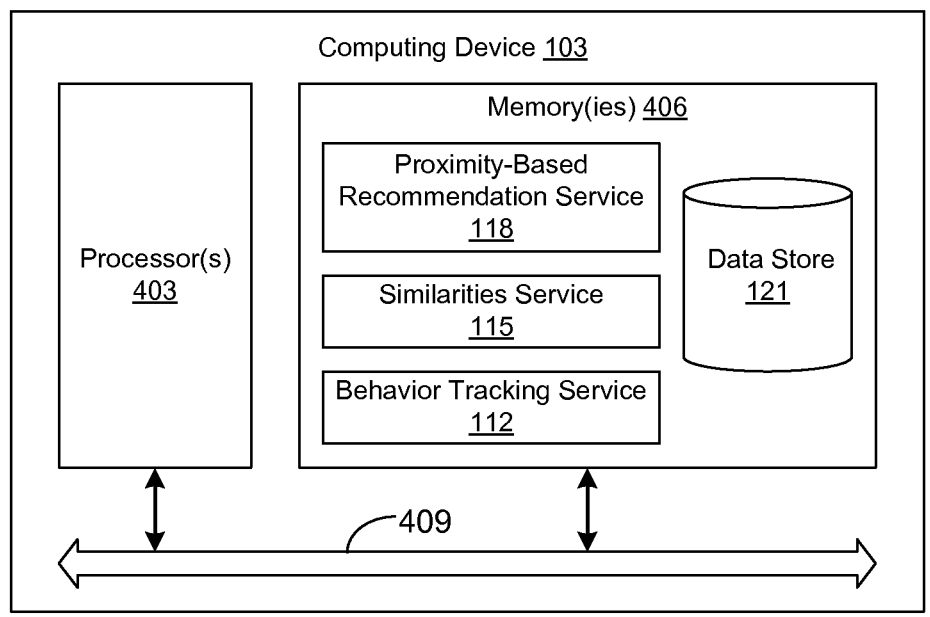
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the behavior tracking service 112, the similarities service 115, the proximity-based recommendation service 118, and potentially other applications. Also stored in the memory 506 may be a data store 121 and other data. In addition, an operating system may be stored in the memory 506 and executable by the processor 503. While not illustrated, the mobile client computing device 106 also include components like those shown in FIG. 5, where by the product identification component 139, the location detection component 142, and the product recommendation application 136 are stored in a memory and executable by a processor.

It is understood that there may be other applications that are stored in the memory 806 and are executable by the processors 803 as can be appreciated. Where any component discussed herein is implemented in the form of software, any one of a number of programming languages may be employed such as, for example, C, C++, C#, OBJECTIVE C, JAVA, JAVASCRIPT, PERL, PHP, VISUAL BASIC, PYTHON, RUBY, DELPHI, FLASH, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the behavior tracking service 112, the similarities service 115, the proximity-based recommendation service 118, the product identification component 139, the location detection component 142, the product recommendation application 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the product recommendation application 136 and the proximity-based recommendation service 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIG. 3 or 4 may be executed concurrently or with partial concurrence. Further, in some embodiments, one or more of the blocks shown in FIG. 3 or 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including behavior tracking service 112, the similarities service 115, the proximity-based recommendation service 118, the product identification component 139, the location detection component 142, and the product recommendation application 136, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications Therefore, the following is claimed:

1. A non-transitory computer-readable medium embodying a program executable in a computing device, wherein when executed the program causes the computing device to at least:
   periodically determine a current location of a client device;
   detect an interaction between the client device and at least one product, wherein the interaction is detected within a physical store and obtains at least one product identifier corresponding to the at least one product via the interaction;
   designate the current location of the client device to be a location of the at least one product of the interaction;
   obtain location information for a plurality of candidate products;
   determine, for individual ones of at least a portion of the candidate products, a corresponding physical proximity between the individual ones of the at least the portion of the candidate products and the location of the at least one product of the interaction;
   identify a proximate product set, based at least in part on the corresponding physical proximity of the candidate products, to include at least one other product in physical proximity to the location of the at least one product of the interaction;
   generate a recommendation for the at least one other product from the proximate product set;
   generate a user interface comprising the recommendation for the at least one other product; and
   cause the user interface to be transmitted to the client device.

2. The non-transitory computer-readable medium of claim 1, wherein the detection of the interaction between the client device and the at least one product causes the computing device to read a radio frequency identifier (RFID) co-located with the product.

3. A method executed by a computing device, the method comprising:
   detecting, by the computing device, an identifier of a product by an interaction of a client device with the product within a physical store;
   determining, by the computing device, that a current location of the client device is a location of the product;
   generating, by the computing device, a user interface associated with an electronic commerce system, the user interface including a recommendation of another product based at least in part on a proximity between the another product and the location of the product; and
   causing, by the computing device, the user interface to be transmitted to the client device.

4. The method of claim 3, further comprising collecting, by the computing device, product location information for the another product as detected by at least one other mobile device, wherein the recommendation is further based at least in part on the product location information.

5. The method of claim 3, wherein the recommendation is further based at least in part on a similarity between the another product and the product in the interaction.

6. The method of claim 3, further comprising designating, by the computing device the current location to be a location of the product in the interaction.

7. The method of claim 3, wherein the detecting further comprises reading, by the computing device, a radio frequency identifier (RFID) associated with the product.

8. The method of claim 3, wherein the detection of the interaction is active.

9. The method of claim 8, wherein the detecting further comprises, by the computing device, scanning a barcode co-located with the product.

10. The method of claim 8, wherein detecting further comprises:
    obtaining, by the computing device, an image of the product; and
    performing, by the computing device, image recognition on the image to identify the product.

11. The method of claim 3, further comprising selecting, by the computing device, another merchant corresponding to the current location of the client device, wherein the another product is selected from a plurality of products carried by the another merchant different from the merchant.

12. The method of claim 3, wherein the another product is selected from a plurality of products carried by a merchant having an online presence.

13. A system, comprising:
    at least one computing device; and
    an application implemented in the at least one computing device, wherein the application when executed is configured to cause the at least one computing device to at least:
        receive a product recommendation request including a current location of a client device and an identifier of a product that is obtained by a detected interaction between the client device and the product at a location of the product;
        generate a recommendation of another product based at least in part on the detected interaction and on a proximity between the another product and the location of the product;
        generate a user interface associated with an electronic commerce system, the user interface comprising the recommendation of the another product in response to the product recommendation request; and
        transmit the user interface to the client device.

14. The system of claim 13, wherein the current location of the client device is specified relative to the location of the product in the detected interaction.

15. The system of claim 13, wherein the generation of the recommendation causes the computing device to:
    identify a proximate product set including at least one other product in physical proximity to a current location of the client device; and
    generate the recommendation of the another product from the proximate product set.

16. The system of claim 15, wherein the identification of the proximate product set causes the computing device to:
    obtain location information for a plurality of candidate products;
    determine, for individual ones of at least a portion of the candidate products, a corresponding physical proximity between the individual ones of the at least the portion of the candidate products and the current location of the client device; and
    identify the proximate product set based at least in part on a physical proximity of the at least the portion of the candidate products.

17. The system of claim 16, wherein the obtaining of the location information causes the computing device to obtain a product catalog including the location information from at least one merchant.

18. The system of claim 16, wherein the obtaining of the location information causes the computing device to collect the location information from a plurality of detected product interactions.

19. The system of claim 13, wherein the application when executed is further configured to cause the at least one computing device to at least:
- collect current location information from the client device over time;
- collect detected product interactions with the client device over time; and
- generate behavior-based search data from the current location information and the detected product interactions.

20. The system of claim 13, wherein the recommendation is further based at least in part on at least one of a product interaction history of the user or a purchase history of the user.

21. The method of claim 3, further comprising:
- identifying, by the computing device, a department of a physical store associated with the current location of the client device; and
- generating, by the computing device, a second recommendation for a complimentary product based at least in part on the department and a second proximity between the complimentary product and the department.

22. The method of claim 3, wherein the interaction of the client device with the product is an in-person interaction rather than an online interaction.

23. The system of claim 13, wherein the interaction of the client device with the product is an in-person interaction rather than an online interaction.

* * * * *